United States Patent Office 3,492,313
Patented Jan. 27, 1970

3,492,313
NOVEL DERIVATIVES OF 1,3,5-TRITHIANE
Elias J. Corey, Cambridge, Mass., assignor to Chas. Pfizer & Co., Inc., New York, N.Y., a corporation of Delaware
No Drawing. Filed Jan. 16, 1967, Ser. No. 609,305
Int. Cl. C07c 77/00
U.S. Cl. 260—327                         2 Claims

ABSTRACT OF THE DISCLOSURE

Preparation of alkali metal salts of symmetrical 1,3,5-trithianes, formed by treating symmetrical 1,3,5-trithianes with alkali metal amides, hydrides, alkoxides, alkylides and phenyls in inert solvents from about $-50°$ to $0°$ C. Reaction of the 1,3,5-trithiane alkali metal salts with: alkyl and arylalkyl halides; haloacetals and esters; 1,3-epoxides; aldehydes; ketones; aryl nitriles; alkyl haloformate esters; carbon dioxide; and alkyl and aryl acyl halides, in inert solvents, provide 2-substituted-1,3,5-trithianes, which upon hydrolysis yield various ketones, aldehydes, diketones, dialdehydes, and aldehydic and ketonic acetals, alcohols, acids and esters.

---

This invention relates to new and useful processes for the preparation of carbonyl compounds, and in particular to the preparation of ketones, aldehydes, diketones, dialdehydes, and aldehydic and ketonic acetals, alcohols, acids, and esters. More particularly, it relates to the preparation of novel 1,3,5-trithianes and processes for their conversion to a wide variety of carbonyl compounds.

Aldehydes and ketones are an important class of carbonyl compounds. Many of these compounds are used as intermediates in organic synthesis and others are widely used in chemical industry. Various aldehydes and ketones are used in the manufacture of perfumes; others are employed as flavoring agents, odorants, and solvents. Certain 1,2-, and 1,3-diketones or their derivatives, e.g., acetylacetone and dimethylglyoxime, form stable chelates with various metal cations, and consequently are used as analytical reagents. Other compounds which contain the carbonyl moiety, e.g., keto and aldehydic acids, acetals, alcohols, and esters, are used extensively as intermediates in organic synthesis.

In many cases, examples of the above-mentioned carbonyl compounds are only obtainable from sundry, unrelated starting materials, and even so, only by means of completely different types of reactions. There is no one, readily available intermediate which would afford one ready access to members of these various types of carbonyl compounds.

This invention provides a convenient and novel synthetic method for the preparation of a broad series of various types of carbonyl compounds. Surprisingly, we have found that this object may be realized by preparing suitable salts of 1,3,5-trithianes and reacting them with various types of organic compounds to provide suitably 2-substituted 1,3,5-trithianes. Upon hydrolytic decomposition, these substituted 1,3,5-trithianes afford useful carbonyl compounds. Among the types of compounds which may be prepared are aldehydes, ketones, diketones, dialdehydes, and aldehydic and ketonic esters, alcohols, acids and acetals. Alternate synthetic routes to these compounds would, in many instances, be quite involved. The present invention, on the other hand, provides a convenient and versatile route for the preparation of carbonyl compounds, which would otherwise only be obtainable with considerable difficulty.

Furthermore, this invention provides a method for temporarily transforming the carbonyl group of an aldehyde into a nucleophilic moiety, which is then capable of participating in nucleophilic displacements, as well as addition reactions.

The present invention comprises the conversion of alkyl and aryl aldehydes to sym-1,3,5-trithianes; the formation of the corresponding sodium, potassium, or lithium salts of these sym-1,3,5-trithianes, and their subsequent reaction with various types of organic compounds to provide novel derivatives of sym-1,3,5-trithianes. Hydrolytic decomposition of these 2-substituted derivatives of the 1,3,5-trithianes affords the desired carbonyl compound.

The necessary 1,3,5-trithianes are readily accessible by known synthetic procedures, as illustrated in the following equation:

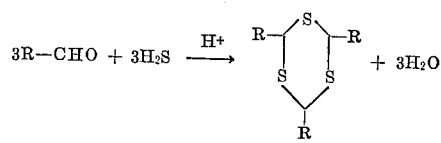

(see for example: U.S. Patent 2,595,173, Apr. 29, 1952; German Patent 762,037; J. A. Stanfield and L. B. Reynolds Jr., J. Am. Chem. Soc., 74, 2878 (1952); E. Campaigne et al., J. Org. Chem., 27, 135 (1962) and references cited therein).

2,4,6-trisubstituted-1,3,5-trithianes may exist in two isomeric forms, namely the cis form wherein all three R groups are on the same side of the molecule, and the trans form wherein two R groups are on one side of the molecule, and the other R group is on the opposite side.

Synthesis of the 1,3,5-trithianes invariably results in the formation of both isomers. Nevertheless, we have not found it necessary to separate the two isomers, since this factor does not appear to be of critical importance in the successful operation of the subsequent processes.

We have found that 1,3,5-trithianes can be converted into their respective sodium, potassium, and lithium salts by reacting them with an appropriate base in an inert solvent at a temperature from about $-50°$ C. to $0°$ C. The reaction undoubtedly occurs as shown in the following equation:

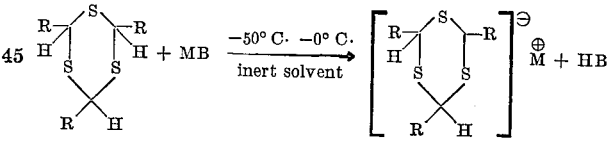

M=Li, Na, K
B=—NH$_2$, H, phenyl, lower alkyl and lower alkoxy.

The presence of the sulfur atoms on either side of the carbon atoms enhances the acidity of the attached hydrogen atoms and stabilizes the generated 1,3,5-trithiane carbanion.

Examples of 1,3,5-trithianes which may be converted to their salts include 1,3,5-trithiane (parent compound) and the 2,4,6-symmetrically substituted trialkyl-, triarylalkyl-, triaryl-, and trialkylaryl-1,3,5-trithianes. Among the bases that have been found useful in the preparation of the 1,3,5-trithianes salts are the amides, hydrides, and lower alkoxides and alkylides of sodium, potassium, and lithium, although the bases that we prefer to use are n-butyl and phenyl lithium. The reaction can be carried out in any inert solvent which does not react with the reactants nor interfere in any way with the course of the reaction. When the sodium, potassium, and lithium amides are used, the solvent of choice is liquid ammonia, whereas with the other bases we have found that anhydrous ethers are suitable solvents.

Among the ethers that have been found satisfactory are tetrahydrofuran, dimethyl and diethyl ether, 1,2-dimethoxyethane and diglyme. Although other ethers, as well

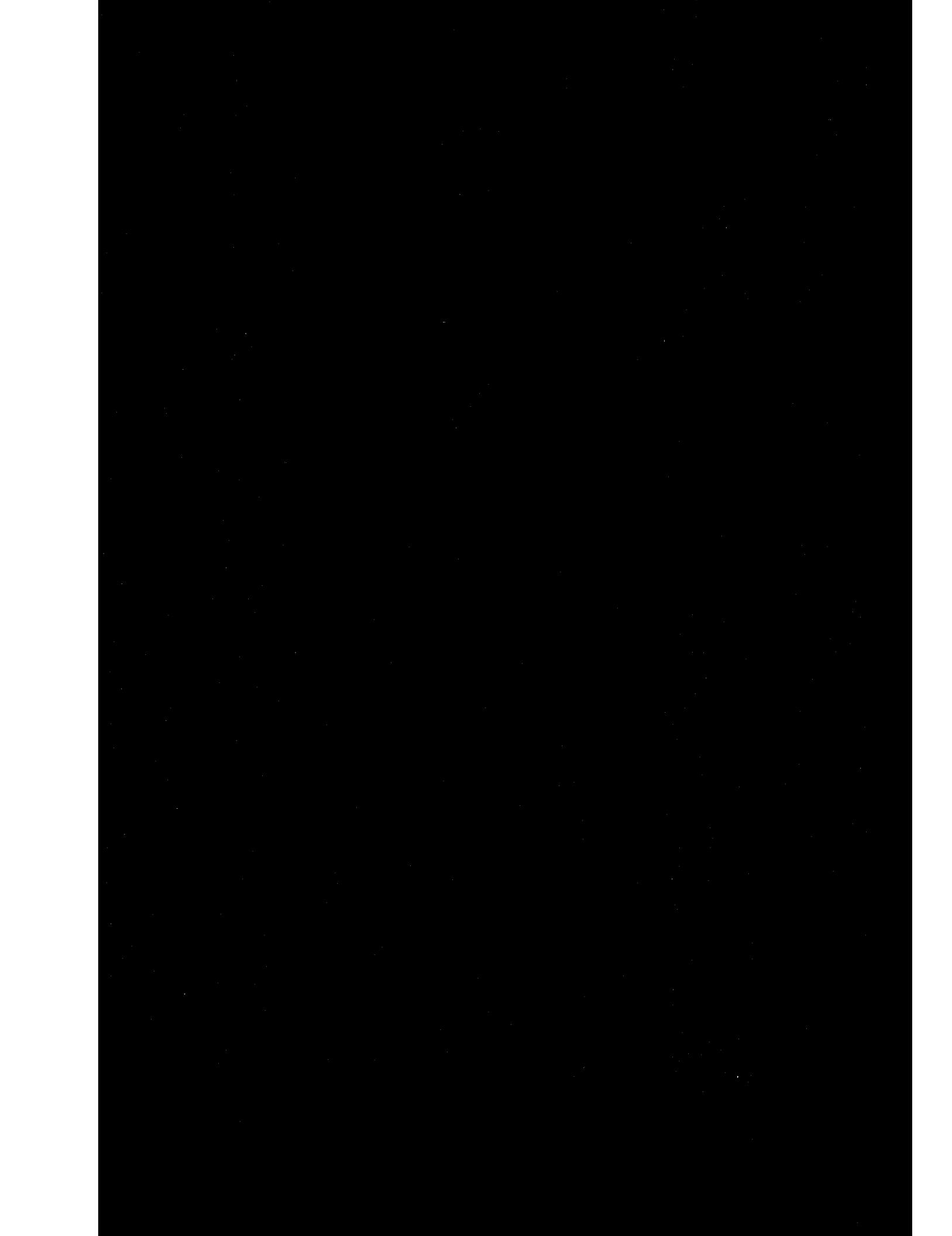

Sequence A, Equations 1 and 2, illustrate, respectively, the formation of 2-substituted 1,3,5-trithiane from the reaction of the 1,3,5-trithiane salts with alkyl and arylalkyl chlorides, iodides, bromides, and arylsulfonates and the carbonyl compounds which are obtained on hydrolytic decomposition of these derivatives.

Sequence B, Equations 1 and 2, illustrates the similar results obtainable from the reaction with alkyl and arylalkyl dichlorides, diiodides, dibromides, and di-arylsulfonates.

Sequence C, Equations 1 and 2, likewise for the reaction with bromo, chloro, iodo and arylsulfonate esters.

Sequence D, Equations 1 and 2, likewise for the reaction with bromo, chloro, iodo, and arylsulfonate acetals.

Sequence E, Equations 1 and 2, likewise for the reaction with carbon dioxide.

Sequence F, Equations 1 and 2, likewise for the reaction with 1,2-epoxides.

Sequence G, Equations 1 and 2, likewise for the reaction with aldehydes and ketones.

Sequence H, Equation 1 illustrates the reaction with aryl nitriles to give imines, the acid hydrolysis of which, as illustrated in Equation 2, provides the corresponding carbonyl compounds. Equation 3 shows the hydrolytic decomposition of these latter compounds to $\alpha$-dicarbonyl compounds.

Sequence I, Equations 1 and 2, show the results obtainable from the reaction with alkyl and aryl acylchlorides and bromides, and alkyl bromo- and chloroformate esters.

Referring now to Sequence A, Equation 1, illustrates the reaction of 1,3,5-trithiane carbanions with alkyl and arylalkyl bromides, chlorides, iodides, and arylsulfonates, such as p-toluenesulfonate. The reaction can also be conducted with compounds that contain 2 displaceable groups, as shown in Equation 1 of sequence B, e.g., alkyl and arylalkyl dibromides, dichlorides, etc. Besides the group to be displaced, e.g., bromo, iodo, iodide, etc., the organic compound may contain other groups which do not participate nor interfere with the reaction. For example, substituted acetals and esters have been successfully reacted, as illustrated in sequences C and D of FIGURE 1.

In carrying out the alkylation reactions illustrated in Equation 1 of sequences A to D, the sym-1,3,5-trithianes salt is prepared, as previously described, and reacted in situ with about one equivalent of the approximate alkylating compound. The alkylating compound is added directly to the stirred salt solution, which is at a temperature from about $-50°$ C. to $25°$ C., although in most cases a temperature between $-20°$ C. to $0°$ C. is preferred. The reaction mixture is stirred for several hours under nitrogen, poured into water, and the product extracted with ether. After removal of the ether, the substituted 1,3,5-trithiane can be purified by conventional techniques, e.g., crystallization, sublimation, distillation, etc.

Hydrolytic cleavage of the novel 1,3,5-trithiane derivatives provides a convenient method of obtaining a wide variety of carbonyl compounds. An examination of the above flow sheet clearly shows the type of compounds which can be prepared. For example, hydrolytic decomposition of the derivatives from the reaction of 1,3,5-trithiane salts with alkyl and arylalkyl bromides, iodides, and aryl sulfonates provides aldehydes or ketones, depending on whether unsubstituted 1,3,5-trithiane or an appropriately substituted 1,3,5-trithiane is used (see Equation 2 of sequence A).

Some of the procedures used to hydrolytically decompose the 1,3,5-trithiane derivatives have been described in the prior art and have been used for the hydrolysis of gem-dialkyl mercaptals.

In one procedure that we have used, the trithiane derivative is heated, usually at the reflux temperature, with mercuric chloride in an aqueous alcohol solution. Mercuric oxide is usually added to the mixture if the resultant aldehyde or ketone contains an acid sensitive group. This procedure is essentially similar to one previously reported by J. English, Jr. and P. H. Griswold, Jr., J. Am. Chem. Soc., 67, 2039 (1945). In the modification employed in the present invention, after heating the 1,3,5-trithiane derivative for several hours with mercuric chloride, the solvent is removed under reduced pressure and the product extracted with boiling ether or pentane. The extracts are combined, washed, dried, and evaporated to provide the desired carbonyl compound. In those cases where mercuric oxide has been used, the carbonyl compound is usually obtained as the corresponding dialkyl acetal or ketal.

Another method comprises reacting the 1,3,5-trithiane derivatives with excess chlorine or bromine, preferably bromine, in aqueous acetic acid which contains a small amount of mineral acid. After the reaction is complete, the reaction mixture is diluted with water and the excess halogen is decomposed with sodium sulfite, and the product is extracted with a suitable organic solvent. This method is similar to one that has been described by F. Weygend et al., Chem. Ber, 90 1230 (1957); ibid., 91, 1040 (1958).

We have also devised another procedure for the hydrolytic decomposition of the 2-substituted 1,3,5-trithianes. We have found that N-bromosuccinimide in aqueous acetone at about $-10°$ C. readily cleaves the 1,3,5-trithiane derivative to the corresponding carbonyl compound in good yield. After completion of the reaction, the excess bromine formed from the N-bromosuccinimide is decomposed with sodium sulfite, and the carbonyl product is isolated by extraction with a suitable organic solvent.

Hydrolytic decomposition of the reaction products obtained from the dihalides, etc., by any of the above hydrolytic procedures provides dialdehydes and diketones (Equation 2 of sequence B). The number of carbon atoms between the carbonyl groups can be conveniently varied by proper choice of the dihalides, etc. The polyfunctional 1,3,5-trithiane derivatives prepared from chloro, bromo, iodo, and aryl sulfonate-substituted esters and acetals, furnish aldehydic and ketonic esters and acetals upon hydrolytic cleavage (Equation 2 of sequences B, C. and D respectively).

Like Grignard reagents, the 1,3,5-trithiane salts also react with carbon dioxide as illustrated in Equation 1 of sequence E. The reaction can be carried out by contacting a solution of the 1,3,5-trithiane salt with anhydrous solid carbon dioxide (Dry Ice); alternatively, a stream of anhydrous carbon dioxide can be passed directly into a stirred solution of the 1,3,5-trithiane salt in an inert solvent at a temperature anywhere from about $-70°$ C. to $0°$ C., although usually the latter temperature is preferred. After the reaction is complete, the mixture is allowed to warm up to room temperature. At this point water can be added to the mixture and the pH of the aqueous phase adjusted to about 5 by the addition of acid, whereupon the 2-carboxy-1,3,5-trithiane separates from the reaction mixture and can be easily separated. It is preferred, however, in order to facilitate the later purification, to first add a mixture of ether and ten percent potassium hydroxide solution to the reaction mixture. The two resulting layers are shaken well and the alkaline aqueous phase is separated. The ether layer is extracted with 10 percent potassium hydroxide and the aqueous alkaline layers are combined, washed with ether and chloroform, cooled in an ice bath, and acidified to pH 5 with a mineral acid. The 2-carboxy-1,3,5-trithiane which separates is extracted with chloroform. Evaporation of the chloroform yields the crude crystalline product which is then recrystallized from a suitable solvent. Hydrolytic cleavage of these 2-carboxy-1,3,5-trithianes provides $\alpha$-carbonyl acids, as shown in Equation 2 of sequence E.

The salts of 1,3,5-trithiane react readily with 1,2-epoxides. The reaction undoubtedly proceeds via a nucleophilic attack on the oxygen-substituted carbon atom of the oxirane ring by the 1,3,5-trithiane carbanion which yields a $\beta$-substituted alcohol as shown in Equation 1 of sequence F in the above flow sheet. In the preferred procedure, after the 1,3,5-trithiane salt is prepared, it is reacted in situ with a solution of one equivalent of the 1,2-epoxide in an inert solvent at a temperature between $-20°$ C. and $0°$ C. The reaction mixture is stirred under nitrogen at about $0°$ for several hours. The mixture is then poured into water and the product isolated by extraction with chloroform. The hydrolysis of the reaction product affords a convenient route to $\beta$-hydroxy aldehydes and ketones (see Equation 2 of sequence F.).

The 1,3,5-trithiane carbanion also adds to the carbonyl double bond of aldehydes and ketones, see Equation 1 of sequence G, a behavior which is very similar to that exhibited by Grignard reagents. The salt of the 1,3,5-trithiane is prepared and reacted in situ with one equivalent of the desired aldehyde or ketone in an inert solvent at a temperature from $-50°$ C. to $25°$ C. In most cases, the reaction is conducted at about $-20°$ C. Alkyl and aryl aldehydes and dialkyl (including cyclic ketones) diaryl, and alkyl aryl ketones can be successfully reacted.

In the preferred mode of reaction, one equivalent of the aldehyde or ketone is added to a stirred tetrahydrofuran solution of the 1,3,5-trithiane salt, which is at a temperature of about $-20°$ C. The reaction mixture is stirred for several hours somewhat above this temperature, poured into water, and the product extracted with chloroform. After removal of the chloroform, the product can be purified by conventional procedures.

In some cases, after evaporation of the chloroform, the product can be separated from any unreacted trithiane by extracting the residue with ether, whereupon the desired product dissolves and can thus be separated from the insoluble 1,3,5-trithiane. $\alpha$-Hydroxy carbonyl compounds are obtained upon hydrolysis of these substituted 1,3,5-trithianes (Equation 2 of sequence G).

The 1,3,5-trithiane carbanion also adds to the triple bond of aryl nitriles to provide ketimines. This is illustrated in Equation 1 of sequence H. In this reaction, the 1,3,5-trithiane salt is reacted with one equivalent of the aryl nitrile in an inert solvent at a temperature from about $-70°$ C. to $+20°$ C., although in practice a temperature of about $0°$ C. is preferred. In the preferred procedure, the aryl nitrile solution is added to a tetrahydrofuran solution of the 1,3,5-trithiane salt, which is at a temperature of about $-70°$ C. The reaction mixture is stirred from about $\frac{1}{2}$ hour at this temperature and then at room temperature for an additional ten minutes. It is poured into water and the ketimine is extracted with ether. After evaporation of the ether, the ketimine can be further purified, or directly converted to the corresponding carbonyl compound by acid hydrolysis in an alcohol-water mixture (see Equation 2 of sequence H). Further hydrolytic decomposition affords aryl $\alpha$-dicarbonyl compounds, as illustrated in Equation 3 of sequence H.

Still another series of compounds which readily react with the 1,3,5-trithiane salts are acyl and aroyl halides, specifically the chlorides and bromides (see Equation 1 of sequence I). As would be expected, we have also found that alkyl bromo and chloroformate esters can be used (see Equation 1, sequence I). Generally, the appropriate organic reagent, e.g., acyl chloride, is added to a stirred solution of the 1,3,5-trithiane salt in an inert solvent. The temperature range over which the reaction can be carried out may vary from $-70°$ C. to $25°$ C.; however, with the bromo and chloroformates the reaction is initially carried out at about $-50°$ C., while with the acyl and aroyl halides, a temperature between $-60°$ C. and $-70°$ C. is preferred.

In the case of the bromo and chloroformate esters, about one equivalent of the ester is added to a solution containing about two equivalents of the appropriate 1,3,5-trithiane salt at about $-50°$ C. The temperature is brought to about $25°$ C. and stirred for several hours. The reaction mixture is diluted with water and extracted with ether. The excess, unreacted 1,3,5-trithiane is separated and the organic extracts are washed with potassium hydroxide solution, water, and dried. Evaporation of the organic solvent affords a crude residue from which the product is separated by extraction with hot ether. After removal of the ether, the product can be further purified by crystallization, sublimation, etc.

With acyl and aroyl halides, we have found that the best results are obtained if the solution of the 1,3,5-trithiane salt is slowly added, with rapid stirring, to a solution of an excess of the organic halide at a temperature of about $-60°$ C. to $-70°$ C. The reaction mixture is stirred for several hours, poured into cold potassium hydroxide solution in order to decompose the excess halide, and extracted with ether. Evaporation of the ether provides the crude product, which can be further purified by conventional means. The hydrolysis of the reaction products of the acyl and aroyl halides and the 1,3,5-trithiane salts gives alkyl and aryl $\alpha$-dicarbonyl compounds, while the reaction products obtained from the alkyl chloro- and bromoformates provides $\alpha$-keto esters; see Equation 2 of sequence I.

It must be recognized that the above reactions of the 1,3,5-trithiane salts represent only a small proportion of the types of reactions in which these compounds may participate, and the above examples are not to be considered exhaustive. In view of the versatility of these compounds, it is obvious that many synthetic schemes, similar to those described herein can be devised employing a wide host of organic compounds.

The following examples are provided to illustrate more fully the present invention; however, they are not to be construed as limiting the scope thereof.

EXAMPLE I

To a stirred, finely dispersed suspension of 20 grams of 1,3,5-trithiane in 400 ml. of anhydrous tetrahydrofuran, which is at $-50°$ C. and under nitrogen, is added in one portion, the stoichiometric amount of a 1.5 M solution of n-butyl-lithium in hexane. The temperature is brought to $-20°$ C. After about two hours, all the 1,3,5-trithiane has dissolved, giving a clear, colorless solution of the lithium salt of 1,3,5-trithiane.

The reaction is repeated in the same manner, and with substantially the same results, with a 1.5 M solution of phenyl-lithium in n-hexane.

EXAMPLE II

To a gray suspension of 0.02 mole of sodium amide in 300 ml. of liquid ammonia, is added, in small portions with vigorous stirring, 0.15 mole of 1,3,5-trithiane, to provide a solution of the sodium salt of 1,3,5-trithiane.

In a like manner, substantially the same results are obtained when sodium amide is replaced by potassium amide and lithium amide.

EXAMPLE III 0.16 mole of finely divided 1,3,5-trithiane is suspended in 400 ml. of anhydrous tetrahydrofuran. The mixture is cooled to about $-20°$ C. and 0.20 mole of sodium hydride is added with stirring. The resulting mixture is stirred below $0°$ C. until the evolution of hydrogen has ceased and all of the insoluble 1,3,5-trithiane has been converted to the soluble sodium salt.

In a like manner sodium hydride is replaced by potassium hydride and lithium hydride with substantially the same results.

EXAMPLE IV

To a finely dispersed suspension of 1,3,5-trithiane in 400 ml. of anhydrous tetrahydrofuran, which is at a temperature of about $-20°$ C. and under nitrogen, is added the stoichiometric amount of a tetrahydrofuran solution of potassium t-butoxide. The reaction mixture is stirred below $0°$ C. until all the 1,3,5-trithiane dissolves, giving a clear, colorless solution of the potassium salt of 1,3,5-trithiane.

In a like manner, the reaction is repeated with substantially the same results with sodium t-butoxide and lithium t-butoxide.

EXAMPLE V

The procedures of Examples I to IV are repeated with the following 1,3,5-trithianes with substantially the same results:

2,4,6-trimethyl-1,3,5-trithiane
2,4,6-tribenzyl-1,3,5-trithiane
2,4,6-triphenyl-1,3,5-trithiane
2,4,6-tri-p-tolyl-1,3,5-trithiane

EXAMPLE VI

General procedure for alkylation of 1,3,5-trithiane carbanions with organic bromides, iodides, chlorides, and aryl sulfonates A solution of the appropriate lithium 1,3,5-trithiane salt is prepared by one of the procedures of Example I to IV. To the stirred solution at —20° C., is added in one portion a 10% excess of the stoichiometric amount of the appropriate organic reagent (vida infra). The reaction mixture is stirred under nitrogen at 0° C. for about five hours. The reaction mixture is poured in three times its volume of water, and the product is extracted with sufficient ether to provide about 70 ml. of ether per expected gram of product. The insoluble matter represents unreacted 1,3,5-trithiane. The ether solution is dried over sodium sulfate. The crude product obtained after evaporation of the solvent is then purified by recrystallization from a suitable solvent.

EXAMPLE VII

Using the procedure of Example VI, 540 mg. (3.55 mmoles, 98%) of crude 2-methyl-1,3,5-trithiane is obtained from the reaction of 3.6 mmoles of the lithium salt of 1,3,5-trithiane which is prepared by the procedure of Example 1, and 4 mmoles of methyl iodide. The crude product is partially purified by sublimation of 65–70° C./ 0.40–0.50 mm. over a period of two hours. The yield is 507 mg. (90%). Recrystallization from pentane gives fine needles, M.P. 86.0–86.3° C.

*Analysis.*—Calc'd for $C_4H_8S_3$: C, 31.58; H, 5.30; S, 63.11. Found: C, 31.30; H, 5.27; S, 63.31.

The infrared spectrum in chloroform exhibits prominent absorption bands at: 3.31, 3.43, 6.94, 7.23, 7.30, 8.37, 8.58, 9.50, 10.29, 11.65, and 14.16$\mu$.

N.M.R. spectrum in deuterochloroform at 60 mc./sec.: $CH_3$ proton signal at tau=8.51 p.p.m., (doublet, J=7.0 c.p.s.).

Analogous results are obtained with methyl chloride, methyl bromide, and methyl p-toluenesulfonate.

EXAMPLE VIII

Following the procedure described in Example VI, 3.4 grams of crude 2-benzyl-1,3,5-trithiane, M.P. 82–86° C., is obtained from the reaction of 14.5 mmoles of the anion of 1,3,5-trithiane, prepared by the procedure of Example I, and 15.1 mmoles of benzyl bromide.

N.M.R. spectrum is deuterochloroform at 60 mc./sec.: $CH_2$ proton signal at tau=7.00 p.p.m., (doublet, J=7.2 c.p.s.), aromatic proton signal at tau=2.8 (singlet).

Comparable results are obtained with benzyl iodide, benzyl chloride, and benzyl p-toluenesulfonate.

EXAMPLE IX

Following the procedure described in Example VI, 3.7 grams (11 mmoles, 95%) of crude 2-n-tetradecyl-1,3,5-trithiane is obtained from the reaction of 11.7 mmoles of the carbanion of 1,3,5-trithiane, prepared by the procedure described in Example I, and 11.6 mmoles of n-tetradecyl bromide.

The crude product is added to $CCl_4$ at 30° C. The undissolved 1,3,5-trithiane is filtered and methanol is added to the filtrate. The pure compound separates as fine needles, M.P. 76.3–76.6° C.

Infrared spectrum in chloroform exhibits prominent bands at: 3.35, 3.43, 6.82, 7.22, 8.21, 8.38, 8.56, 11.65, and 13.9$\mu$.

N.M.R. spectrum in deuterochloroform at 60 mc./sec.: $CH_3$ proton signal at tau=9.13 p.p.m. (degenerate doublet) $CH_2$ proton signal at tau=8.73 p.p.m., (very sharp singlet with broad base).

*Analysis.*—Calc'd. for $C_{17}H_{34}S_3$: C, 61.05; H, 10.25; S, 28.70. Found: C, 60.83; H, 10.19; S, 28.70.

Comparable results are obtained with n-tetradecyl chloride and n-tetradecyl iodide.

EXAMPLE X

Following the procedure of Example VI, 1.98 grams (ca. 65%) of crude pentamethylene-bis - 1,3,5-trithiane M.P. 107–110° C. is obtained from the reaction of 14.5 mmoles of the 1,3,5-trithiane anion, prepared by the procedure of Example I, and 7.25 mmoles of 1,5-diiodopentane.

The infrared spectrum in chloroform shows prominent bands at: 3.35, 3.42, 6.88, 7.23, 8.40, 8.57, 11.10, and 11.8$\mu$.

N.M.R. spectrum is deuterochloroform at 60 mc./sec.: Very complex 0.8 p.p.m. broad multiplet centered at tau=8.4 p.p.m.

Comparable results are obtained with 1,5-dichloropentane and 1,5-dibromopentane.

EXAMPLE XI

In a manner similar to that of Example X, 1,10-dibromodecane is reacted with the anion of 1,3,5-trithiane to give decamethylene-bis-1,3,5-trithiane.

EXAMPLE XII

Following the procedure of Example VI, 15 moles of the anion of 1,3,5-trithiane prepared by the procedure of Example I, is reacted in situ with 15 mmoles of ethyl bromoacetate. The product, 2-carbethoxymethyl-1,3,5-trithiane is purified by the method described in Example VI.

EXAMPLE XIII

Following the procedure of Example VI, 15 mmoles of the anion of 1,3,5-trithiane, prepared by the procedure of Example I, is reacted in situ with 15 mmoles of ethyl 12-bromododecanoate. The product, ethyl 12-(1,3,5-trithiane)-3-dodecanoate, is purified by the method described in Example VI.

EXAMPLE XIV

Following the procedure of Example VI, 15 mmoles of the anion of 1,3,5-trithiane prepared by the procedure of Example I, is reacted in situ with 15 mmoles of 2-bromoacetal. The product, 2-(1,3,5-trithiane)-acetal is purified by the method described in Example VI.

EXAMPLE XV

Following the procedure of Example VI, 15 mmoles of the anion of 1,3,5-trithiane prepared by the procedure of Example I, is reacted in situ with 15 mmoles of 1,1-diethoxy-12-bromododecane. The product, 1,1-diethoxy-12-(1,3,5-trithiane)-dodecane is purified by the method described in Example VI.

EXAMPLE XVI

A solution of the lithium salt of 1,3,5-trithiane in a mixture of 50 ml. of tetrahydrofuran and 11 ml. of n-hexane is prepared from 16.4 mmoles (2.27 grams) of 1,3,5-trithiane by the method of Example I. To this stirred solution at —70° C. is added in one portion 1.70 grams (16.5 mmoles) of benzonitrile. A clear, deep orange-colored solution is formed. Stirring is continued at —70° C. for 35 minutes; the bath is removed and the solution stirred at room temperature for 10 minutes.

The mixture is quickly poured into three times its volume of water and extracted with four 50 ml. portions of ether. The ether extracts are combined, washed with water, and dried over anhydrous sodium sulfate. Evaporating of the ether affords crude phenyl 1,3,5-trithiane ketimine.

EXAMPLE XVII

The phenyl 1,3,5-trithiane ketimine of Example XVI is refluxed with stirring in 150 ml. of a 4% HCl solution in 50% aqueous-methanol, for one hour. Water is added and the product is extracted with chloroform. The chloroform extracts are combined, washed with water, and dried over anhydrous $Na_2SO_4$. Evaporating of the ether affords 3.55 grams (90%) of slightly yellow crystals of impure 2-benzoyl-1,3,5-trithiane, M.P. 147–152° C. Fractional crystallization from chloroform yields 2.70 grams (68%) of pure material as colorless, very fine clustered needles, M.P. 152.0–152.5° C.

Infrared spectrum (saturated solution in $CHCl_3$) reveals prominent absorption bands at: 3.30, 5.93, 6.27, 6.33, 6.91, 7.24, 7.60, 7.95, 8.42, 9.97, 10.03, 11.27, 12.30, 14.23 and 14.61$\mu$.

N.M.R. spectrum in deuterochloroform at 60 mc./sec.: aromatic protons appear as two 0.25 p.p.m. broad multiples centered at tau=2.5 and 2.0 p.p.m., respectively.

*Analysis.*—Calc'd. for $CH_{10}H_{10}OS_3$: C, 49.59; H, 4.16; S, 39.65. Found: C, 49.53; H, 4.27; S, 39.38.

EXAMPLE XVIII

The procedure of Examples XVI and XVII are repeated with p-tolylnitrile with substantailly the same results.

EXAMPLE XIX

General procedure for the reaction of the 1,3,5-trithiane carbanions with aldehydes and ketones A solution of the alkali metal salt of the 1,3,5-trithiane is prepared in situ by one of the procedures of Examples I to IV. To the stirred solution of the salt at −20° C., is added approximately the stoichiometric amount of the carbonyl compound. The reaction mixture is stirred under nitrogen at ca. 0° C. until the reaction is complete. The reaction mixture is then poured into about three times its volume of water, and the product is extracted with sufficient chloroform to provide of 50 ml. of chloroform per gram of expected product. The chloroform extracts are dried over anhydrous sodium sulfate and evaporated to yield the crude product which is further purified.

EXAMPLE XX

Employing the procedure of Example XIX, 16.3 mmoles of the lithium salt of 1,3,5-trithiane, prepared by the procedure of Example I, and 16.4 mmoles (2.07 grams) of cyclooctanone are reacted at −20° C. for two hours, and at 0° C. for five hours. After evaporation of the chloroform extracts, 3.99 grams of crude 1-(1,3,5-trithiane)-cyclooctanol is obtained, which is extracted with boiling ether. Filtration of the hot ether yields 0.32 gram (13.5%) of unreacted 1,3,5-trithiane. To the residue obtained upon evaporation of the ether filtrate (3.45 grams, 80%), is added 100 ml. of boiling pentane.

Sufficient benzene is added dropwise to the boiling mixture until the product just dissolves. Cooling the solution provides 2.62 grams (61%) of clusters of fine, short needles, M.P. 79.2–79.7° C.

The infrared spectrum in chloroform shows prominent absorption bands at: 2.76, 2.83, 3.38, 3.47, 3.69, 6.80, 7.24, 8.22, 9.47, 9.84, and 13.76$\mu$.

N.M.R. spectrum in deuterochloroform at 60 mc./sec.: OH proton signal at tau=7.95 p.p.m.; cyclooctane methylene proton signal (0.7 p.p.m. broad multiplet at tau=8.3); ratio 1:10. The molecular weight is 264 by mass spectroscopy.

*Analysis.*—Cal'd for $C_{11}H_{20}OS_3$: C, 49.99; H, 7.63; S, 36.33. Found: C, 50.01; H, 7.52; S, 36.28.

EXAMPLE XXI

Using a procedure similar to that of Example XIX, 4.39 mmoles of the lithium salt of 1,3,5-trithiane prepared by the precdure of Example I, is reacted with 4.67 mmoles of benzophenone in 8 ml. of anhydrous tetrahydrofuran for 10 minutes a −10° C. and for two hours at 24° C., to give 1.27 grams of crude 2-benzyhydrol-1,3,5-trithiane. After extraction of the excess benzophenone with boiling pentane, 1.21 grams (86%) of 2-benzyhydrol-1,3,5-trithiane is obtained as colorless crystals. The compound may be further purified by recrystallization from methanol, M.P. 181.5–181.9° C.

The infrared spectrum in chloroform shows prominent bands at: 2.85, 3.25, 3.31, 3.43, 6.69, 6.93, 7.50, 8.60, 9.47, 9.86 and 14.4$\mu$.

N.M.R spectrum in deuterochloroform at 60 mc./sec.: OH proton signal at tau 6.70 p.p.m. (singlet); aromatic protons centered at 2.6 p.p.m. (0.6 p.p.m. broad multiplet); ratio 1:10.

*Analysis.*—Calc'd. for $C_{16}H_{16}OS_3$: C, 60.00; H, 5.04; S, 29.97. Found: C, 60.04; H, 5.02; S, 29.06.

EXAMPLE XXII

Using the procedure of Example XIX, the following aldehydes and ketones are similarly reacted with the lithium salt of 1,3,5-trithiane with substantially the same results being obtained:

Formaldehyde
Acetaldehyde
Acetone
Acetophenone
Di-n-butyl ketone
Benzaldehyde
Dibenzyl ketone
Di-p-tolyl ketone

EXAMPLE XXIII

To 77.6 mmoles of the carbanion of 1,3,5-trithiane prepared by the procedure of Example I, is added at −50° C., 31.3 mmoles of ethyl chloroformate. The temperature is allowed to rise to 25° C. After six hours the mixture is poured into three times its volume in water, and extracted with ether. The excess, undissolved 1.35-tri-8.54, 8.80, 9.97, and 11.25$\mu$.

thiane is separated and the combined organic layers (380 ml.) are washed with 8% KOH and water and dried over $Na_2SO_4$. Evaporation of the ether gives 4.55 grams of a solid material, which is extracted with three 30-ml. portions of boiling ether. 1.35 grams of 1,3,5-trithiane remain undissolved and 3.25 grams of product are obtained after evaporation of the ether. The M.P. is 98.0–100.3° C. This material is subjected to fractional sublimation at 70° C./0.05 mm. 1,3,5-trithiane sublimes first. The sublimed product is recrystallized from ethanol to give colorless needles, M.P., 103.0–103.6° C.

The infrared spectrum in chloroform exhibits prominent absorption bands at: 3.33, 5.79, 6.95, 7.30, 7.78, 8.54, 8.80, 9.79, and 11.25$\mu$.

N.M.R. spectrum in deuterochloroform at 60 mc./sec.: $CH_3$ triplet of the ethyl group at tau 8.67 p.p.m.; $CH_2$ quartet at tau=5.73 tau, J=7.5 c.p.s. The molecular weight is found by mass spectroscopy to be 210.

*Analysis.*—Calc'd. for $C_6H_{10}O_2S_3$: C, 34.29; H, 4.80; S, 45.69. Found: C, 34.15; H, 4.74; S, 45.68.

Similar results are obtained with ethyl bromoformate.

EXAMPLE XXIV

Using the general procedure of Example XXII n-octyl chloroformate is reacted with the lithium salt of 1,3,5-trithiane at about −60° C. with substantially the same results.

EXAMPLE XXV

The lithium salt of 1,3,5-trithiane, prepared by the procedure of Example I, is slowly added with rapid stirring to an excess of formyl chloride in anhydrous tetrahydrofuran at about −60 to −70° C. The reaction mixture is stirred for several hours and then poured into cold 5% KOH solution to decompose the excess acid chloride. The product is extracted with ether. The ether extracts are combined, washed with water, and dried over anhydrous sodium sulfate. Evaporation of the ether provides the crude product which is purified by suitable means (recrystallization from an appropriate solvent, etc.).

EXAMPLE XXVI

Using the general procedure of Example XXV, the following acid chlorides are used in place of formyl chloride, with substantially the same results being obtained:

Acetyl chloride
Benzoyl chloride
p-isopropyl benzoyl chloride
α-phenyl acetyl chloride The corresponding acid bromides may be used in place of the acid chlorides.

EXAMPLE XXVII

Anhydrous carbon dioxide is passed into a stirred solution of the lithium salt of 1,3,5-trithiane in anhydrous tetrahydrofuran, which has been prepared by the procedure of Example I, at 0° C. The carbon dioxide is added until all the anion reacts and the solvent is saturated with carbon dioxide. The mixture is allowed to warm up to room temperature and ether and 10% KOH are added. The two resulting layers are shaken well and separated. The ether layer is extracted twice with 10% KOH. The aqueous alkaline layers are combined, washed with ether and chloroform, cooled in ice bath and acidified to pH 5 by the dropwise addition of concentrated HCl. The 2-carboxy-1,3,5-trithiane which separates is extracted with chloroform. The extracts are combined and dried over anhydrous sodium sulfate. Evaporation of the chloroform yields the crude crystalline product, which may be further purified by recrystallization from a suitable solvent.

EXAMPLE XXVIII

Into 10 ml. of anhydrous tetrahydrofuran is dissolved 10 moles (1.2 grams) of styrene oxide. To this stirred solution, which is under nitrogen and at a temperature of 0° C., is added 20 ml. of a tetrahydrofuran solution of 10 mmoles of the lithium salt of 1,3,5-trithiane, prepared by the procedure of Example I, which is at a temperature of −20° C.

The flask is sealed under nitrogen, and stored at 0° C. for 3 days. The colorless reaction mixture is poured into three times its volume of water and extracted several times with chloroform. The chloroform extracts are combined, washed with water, and dried over anhydrous potassium carbonate. Evaporation of the chloroform affords 2-(2-hydroxy-2-phenylethyl)-1,3,5-trithiane.

The reaction is repeated in the same manner with the following 1,2-epoxides, and substantially the same results are obtained.

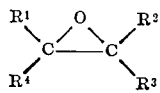

| R¹ | R² | R³ | R⁴ |
|---|---|---|---|
| H | H | H | H |
| CH₃ | CH₃ | CH₃ | CH₃ |
| n-C₄H₉ | n-C₄H₉ | n-C₄H₉ | n-C₄H₉ |
| C₆H₅ | C₆H₅ | C₆H₅ | C₆H₅ |
| p-CH₃C₆H₄ | p-CH₃C₆H₄ | p-CH₃C₆H₄ | p-CH₃C₆H₄ |
| p-iC₃H₇C₆H₄ | p-iC₃H₇—C₆H₄ | p-iC₃H₇—C₆H₄ | p-iC₃H₇—C₆H₄ |
| C₆H₅—CH₂ | C₆H₅—CH₂ | C₆H₅—CH₂ | C₆H₅—CH₂ |
| C₆H₅ | CH₃ | H | H |
| C₆H₅ | C₆H₅ | H | H |
| CH₃ | CH₃ | H | H |
| CH₃ | H | H | H |

EXAMPLE XXIX

The procedure of Examples VI to XXVI are repeated, with comparable results, using the substituted 1,3,5-trithianes listed in Example V.

EXAMPLE XXX

General procedures for the hydrolysis of the 1,3,5-trithiane derivatives obtained from the procedures of Examples VI to XXIX.

Any of the following procedures may be used to hydrolyze the 1,3,5-trithiane derivatives obtained from the reactions described hereinabove.

Method A 10 mmoles of the 1,3,5-trithiane derivative is heated, usually under reflux, with vigorous stirring with 25 mmoles of $HgCl_2$ and 20 moles HgO, from about 3 to 10 hours, in 100 ml. of 80–95% aqueous lower-alkanol, such as methanol. If the hydrolysis provides a ketone or aldehyde which has no acid sensitive group, the HgO may be omitted.

The solvent is removed with a rotary evaporatol at reduced pressure, and the residue is extracted with several portions of hot ether or pentane. The extracts are combined and successively washed with water, concentrated ammonium acetate solution, saturated sodium bicarbonate solution, and water. After drying the extracts over anhydrous sodium sulfate, the solvent is evaporated and the product purified by a suitable means (distillation, conversion to a chemical derivative, etc.).

Under neutral conditions in the presence of HgO (see above), dialkylacetals or ketals, rather than corresponding free carbonyl compounds are obtained in many cases.

Method B

A solution of 1 mmole of the 1,3,5-trithiane derivative in ca. 5 ml. of acetone is added with stirring at about −10° C. to a solution of from 6–9 mmoles of N-bromosuccinimide in about 25 ml. of 97% aqueous acetone. Within a short time the reaction begins and the orange red color of bromine becomes evident. The temperature raises to 0° C., or slightly above. After several minutes, about 10 ml. of a half-saturated solution of sodium sulfite is added to decompose the excess bromine. The reaction mixture is shaken well with a mixture consisting of 15 ml. of 1:1 methylenechloride-pentane and 10 ml. of a half-saturated sodium bicarbonate solution. The organic phase is separated, washed with water and 10 ml. of a saturated salt solution, and then dried over anhydrous magnesium sulfate. Evaporation of the solvent provides the desired carbonyl compound, which may be purified by standard methods.

Method C 4 mmoles of the 1,3,5-trithiane derivative is dissolved in 12 ml. of glacial acetic acid. To this solution is added 4 ml. of water and 1 ml. of concentrated hydrochloric acid. The mixture is heated to 45–50° C. on a water bath and a solution of 8 mmoles of bromine in 2 mls. of glacial acetic acid is added all at once with vigorous stirring. Another 2–3 ml. of water is added, and the mixture is stirred for an additional 5–6 hours at room temperature.

The reactions mixture is diluted with water and a sufficient amount of a half-saturated solution of sodium sulfite is added to decompose any excess bromine.

The reaction mixture is extracted with a 1:1 mixture of methylene chloride and pentane. The extracts are combined and washed successively with water, a saturated sodium bicarbonate solution, again with water, and finally dried over anhydrous magnesium sulfate. Evaporation of the solvent yields the desired carbonyl compound which may be purified by standard methods.

The reaction can be repeated with chlorine instead of bromine.

EXAMPLE XXXI 2-benzyl-1,3,5-trithiane, prepared as described in Example VIII, is hydrolyzed in methanol using the procedure of Method A in Example XXX. The reaction mixture is refluxed for 3½ hours and a yield of 63% (based on the starting halide) of phenylacetaldehyde, isolated as the 2,4-dinitrophenylhydrazone, is obtained.

EXAMPLE XXXII 2-n-tetradecyl-1,3,5-trithiane, prepared as described in Example IX is hydrolyzed in methanol using the procedure of Method A in Example XXX. The reaction mixture is refluxed for 4 hours. An 80% yield (based on the starting halide) of the diacetal of n-pentadecanal is obtained. This acetal provides a 74% yield (based on the starting halide) of the corresponding 2,4-dinitrophenylhydrazone.

EXAMPLE XXXIII

Pentamethylene-bis - 1,3,5 - trithiane, prepared as described in Example X, is hydrolyzed in methanol using the procedure of Example XXX. The reaction mixture is refluxed for 3 hours. The carbonyl compound is isolated as the acetal of 1,7-heptanedial in 40% yield (based on the starting halide). The carbonyl compound is characterized by conversion to the corresponding disemicarbazone.

EXAMPLE XXXIV

The hydrolyses described in Examples XXXI to XXXIII can be repeated using Methods B and C of Example XXX with substantially the same results.

EXAMPLE XXXV

The 1,3,5-trithiane derivatives prepared in Examples XII–XV, XVII, and XX to XXIX can be readily hydrolyzed to the respective carbonyl compounds, in a manner similar to those illustrated in Examples XXI to XXXIV, by any of the methods of Example XXX.

EXAMPLE XXXVI

The lithium salts of the 2-substituted-1,3,5-trithiane mentioned in Example V are used with the procedures described in Examples VI to XXXV, and the results are comparable to those obtained with the lithium salt of 1,3,5-trithiane.

What is claimed is:

1. A compound of the formula:

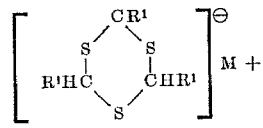

wherein $R^1$ is a member selected from the group consisting of hydrogen, alkyl containing up to 5 carbon atoms, phenyl, alkylphenyl and phenylalkyl wherein the alkyl substituent contains up to 3 carbon atoms; and M is an alkali metal cation.

2. A carbanion of the formula:

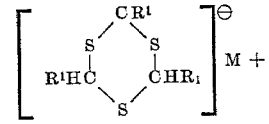

wherein $R^1$ is a member selected from the group consisting of hydrogen, alkyl containing up to 5 carbon atoms, phenyl, alkylphenyl and phenylalkyl wherein the alkyl substituent contains up to 3 carbon atoms and M is lithium.

References Cited

Corey et al.: Angew. Chem., Internat. Ed., vol. 4 (1965), pages 1075–7.

Truce et al.: J. Organic Chem., vol. 28 (1963), pages 961–964.

JAMES A. PATTEN, Primary Examiner

U.S. Cl. X.R.

260—591, 592, 593, 599, 601, 348, 483, 602, 594, 526–410.9